March 12, 1968 L. R. McGRATH ET AL 3,372,606
HYDRAULIC VALVE CONTROL LEVER
Filed Sept. 13, 1966
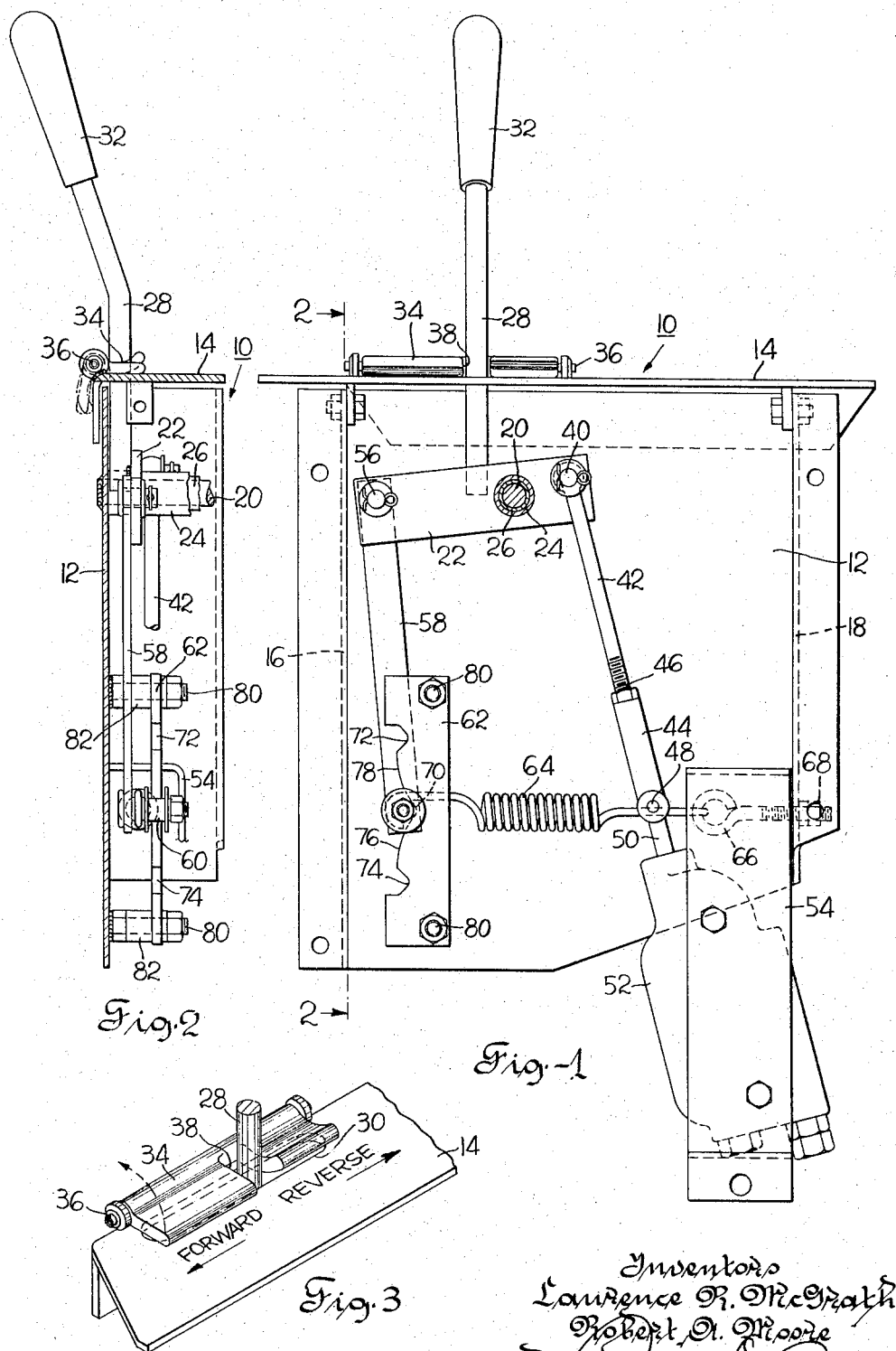

United States Patent Office 3,372,606
Patented Mar. 12, 1968

3,372,606
HYDRAULIC VALVE CONTROL LEVER
Laurence R. McGrath, Milwaukee, and Robert A. Moore, Waukesha, Wis., assignors to Allis-Chalmers Manufacturing Company, Milwaukee, Wis.
Filed Sept. 13, 1966, Ser. No. 578,624
9 Claims. (Cl. 74—491)

The present application relates to a control lever construction and particularly to detent mechanism for such a control lever, and an object of the invention is to generally improve mechanisms of this class.

Levers are commonly used to control basic elements in machinery such, for example, as valves, clutches, rheostats, etc., and which control elements of the larger mechanism. Such elements must be in themselves controlled to a certain extent; for example, when they are placed in a desired position, it is commonly desirable that they will stay in that position until intentionally dislodged. It is also desirable that the control lever have a certain amount of "feel" so that an operator may have a sense of control or feeling of how much a valve has been moved, etc. The amount of travel of these valves is commonly small; and such control mechanism in the past has been composed of relatively small parts involving high mechanical pressures and rapid wear, satisfactory life being accomplished only by going to expensive materials, heat treating, and costly and accurate fabrication; and it is the principal object of the invention to provide a construction which will avoid these difficulties.

The invention involves a cam and follower mechanism for a control lever which will control the machine element with accuracy and which will give the operator sensitive "feel" of the position of the valve or element. The mechanism involves a cam and follower element which is relatively large so as to afford generous tolerances in manufacture and in which relatively gentle pressures are all that are needed between the parts and so that the arrangement will have satisfactory durability and life characteristics without the use of costly material.

Basically, the device comprises an arrangement wherein the motion of the cam element is multiplied in relation to that of the controlled element, valve or the like, so that errors in the cam movement resulting from generous tolerances, wear, etc. are divided by the ratio before being transmitted to the valve or other element and become insignificant insofar as practical operation is concerned.

Other objects and advantages will become apparent from the following specification and annexed drawings in which:

FIG. 1 is an elevation of the back of an assembly of a control lever cam and valve embodying the invention.

FIG. 2 is a vertical sectional view taken on the line 2—2 of FIG. 1.

FIG. 3 is an enlarged fragmentary perspective of a portion of FIG. 2 taken from above to the right.

The device as seen in FIG. 1 comprises a support or casing 10 having a side wall 12, a top wall 14, and end walls 16 and 18, and arranged to be fixed on the upstanding wall of a tractor seat, transmission case, or the like wherever convenient, and which will close the otherwise open side of the casing opposite wall 12. Wall 12 has rigidly fixed thereto a pivot pin 20 in the present instance offset toward walls 14 and 16. A rocking lever 22 is journaled in a generally horizontal position on pin 20, having a sleeve 24 disposed about pin 20, a bushing 26 being interposed for satisfactory bearing life. Rocker lever 22 has a hand lever 28 fixed thereto and extending upwardly out of casing 10 through a slot 30 in upper wall 14 (see also FIG. 3) and having a handle 32, the parts being so arranged that handle 32 will be in a position convenient to the operator. A safety locking plate 34 is supported on a pintle 36 fixed in relation to upper wall 14 and overlaps slot 30, having a slot 38 of its own transverse to slot 30 for passage of hand lever 28. With locking plate 34 in the FIG. 3 position, lever 28 is prevented from being shifted out of the position shown, which in the illustrative example is a neutral position.

Displaced a short distance from pin 20, rocking lever 22 has a pivot pin 40 on which is journaled an actuating means or link 42. Link 42 connects, through a clevis 44, in which it has a threaded connection at 46, and through a pin 48, with the stem 50 of a controlled element 52, in the disclosed embodiment a fluid pressure valve 52 which may be of suitable or well-known type and which, in the present instance, is supported on a bracket 54 rigidly fixed on wall 18 of casing 10. With locking plate 34 swung out of the way, forward and backward rocking of hand lever 28 will accordingly cause upward and downward movement of stem 50 and suitable actuation of machine elements connected to controlled element 52.

It should be understood (assuming element 52 to be a valve) that a variety of operations could be controlled by the fluid controlled thereby, in the present instance it being contemplated that forward and reverse clutches in the tractor would be so controlled. Valves of the type of 52 commonly have two or more operating positions for stem 50 and, although the motion is usually slight, have detent arrangements which tend to yieldingly hold stem 50 in one or another of the desired positions. In the present arrangement no detent mechanism is incorporated in valve 52, but suitable detent mechanism is connected with rocker lever 22.

A pin 56, located at a greater distance from pin 20 than pin 40 pivotally connects a detent link 58 to rocker lever 22, link 58 extending transversely to lever 22 so as to receive longitudinal movement when lever 22 is rocked. Link 58 has a cam follower element 60 fixed thereon and positioned to engage a cam element 62 fixed in any suitable manner on wall 12. A resilient element or tension spring 64 is engaged with a portion of follower element 60 and extends transversely to link 58 and is engaged with an eyebolt 66 extending through and supported by wall 18. Eyebolt 66 has lock nuts 68 thereon engaged with wall 18 and which may be adjusted to increase or decrease the tension in spring 64.

Cam element 62 has a central notch 70 arranged to effect a neutral position in valve stem 50, a notch 72 positioned to effect an engagement of a reverse clutch by reason of the resulting position of valve stem 50, and a notch 74, the position of which will result in the engagement of a forward clutch. In each instance, the pull of spring 64 will hold detent element 60 in the desired notch and prevent inadvertent displacement of the parts, including stem 50. Between notches 70 and 74, cam 62 has a ramp portion 76 which slopes outwardly from notch 70 so as to give an increasing resistance to movement of detent follower 60 as it is displaced from notch 70 by rocking of lever 22; and ramp 76 may be readily shaped so as to give a change in resistance to rocking of lever 22 and accordingly of lever 28 and handle 32 in any desired rate pattern to result in the desired "feel" in handle 32.

It is to be noted that displacement of follower 60 even in the absence of a sloping ramp as 76 will result in an increase in the tension in spring 64, and the slope and contour of ramp 76 may be selected to modify this natural increase in tension in any desired manner.

Between notch 70 and notch 72, a similar ramp 78 is provided which operates in a similar manner.

Cam element 62 is held in place by bolts as 80 and spaced from wall 12 by spacers 82.

In operation, safety plate 34 is swung out of the way; and lever 28 is swung in the desired direction for either forward or reverse operation. Assuming forward operation, such movement rocks rocker lever 22 in a counterclockwise direction, pulling upwardly on link 42 and raising valve stem 50. Such operation also displaces detent follower 60 from notch 70 and causes it to travel along ramp 76, thus additionally stressing spring 64. As the movement continues, the resistance of spring 64 operating through detent follower 60 increases the resistance to movement of handle 32 and gives the desirable feel to the operation. After sufficient movement of handle 32, follower 60 will engage notch 74 whereupon the apparatus will stay in the forward position until deliberately disengaged therefrom by a pull on lever 32. Notches 70, 72 and 74 are intended to accomplish certain definite positions of stem 50; and in order to make sure of this, clevis 44, with pin 48 removed, may be screwed farther on or off of link 42 until such correspondence is relatively perfect. It will be noted that the movement of follower 60 is several times that of stem 50 so that minor errors in tolerance or wear will not cause sufficient inaccuracy in movement of stem 50 to adversely affect the operation; and in view of the relatively generous size and travel of the parts, high detent pressures are not necessary, and no undue wear will take place. Furthermore, it is not necessary to make these larger parts from hard costly material since the wear in any event will be minimal.

Although a specific embodiment of the invention has been shown and described, it is contemplated that variations will occur to those skilled in the art. For example, rocker lever 22 might be in some other position than generally horizontal with appropriate and corresponding rearrangement of the other parts; and it is to be understood that the invention is not to be taken as limited by the disclosure or in fact in any manner except as defined in the claims.

The embodiments of the invention in which an exclusive property or privilege is claimed are defined as follows:

1. A control device comprising a support, a pivot on said support, a rockable lever assembly journaled on said pivot, a detent link pivotally connected to said lever assembly at a point spaced from said pivot and extending transversely thereof, a detent cam element and a detent cam follower element, one of said elements being fixed on said support and the other of said elements being carried by said detent link, resilient means connected with said link, extending transversely thereof, and anchored to said support in position to continuously urge said cam element and said cam follower element into yielding contact with each other, and means connected to said lever assembly and to a controlled element for actuating said element by reason of rocking of said lever assembly.

2. A control device having all the characteristics of claim 1 in which said detent cam element provides a plurality of notches which are engaged by the follower element by reason of the urging of said resilient means and operative to yieldingly maintain the controlled element in a predetermined position in accordance with the particular notch engaged at any particular time by said detent follower element.

3. A control device having all the characteristics of claim 1 in which said detent cam element provides a notch which is engaged by the follower element by reason of the urging of said resilient means, said cam element having a pair of ramp surfaces sloping outwardly from said notch, whereby under the urging of said resilient means, said cam and follower elements tend at all times to return said follower element to said notch and to return said controlled element to a predetermined corresponding position.

4. A control device having all the characteristics of claim 1 wherein said detent cam element has a central position for said follower element in which said means connected to said controlled element maintains said controlled element in a predetermined position, and in which said resilient means comprises a tension spring connected to one of said detent elements and anchored to said support, said cam element having a ram surface extending generally in the same direction as said link on either side of said central position, and said spring extending substantially normal to said link when said detent cam follower is in said central position, whereby to exert an increasing force, as said follower is displaced from said central position along said ramp surface, in a direction to return said follower to said central position.

5. A control device having all the characteristics of claim 1 in which said detent cam element has a central notch in which said detent follower becomes engaged when said controlled element is in a predetermined desired position, and in which said resilient means comprises a tension spring connected to one of said detent elements and anchored to said support, said cam element having a ramp surface extending generally in the same direction as said link on either side of said notch, and said spring extending substantially normally to said link when said detent follower is in said notch, whereby to exert an increasing force, tending to return said follower to said notch as said follower is displaced from said notch along said ramp surface in either direction.

6. A control device having all the characteristics of claim 1 wherein said detent cam follower element is carried on said detent link and said resilient means comprises a tension spring connected with said detent cam follower and anchored to said support, said spring extending transversely to said detent link in all positions of said rockable lever assembly.

7. A control device having all the characaterístics of claim 1 wherein said detent cam follower element is carried on said detent link and said resilient means comprises a tension spring connected with said detent cam follower and anchored to said support, said spring extending substantially normal to said link in one position of said rockable lever assembly, whereby to exert an increasing force, as said follower is displaced from said one position in either direction to return said follower to said one position.

8. A control device having all the characteristics of claim 1 in which said resilient means comprises a tension spring connected to said link and extending transversely thereof, and in which said support provides anchoring means thereon for said spring, and said anchoring means having means for adjusting the anchoring point of said spring for increasing and decreasing the tension in said spring when desired.

9. A control device having all the characteristics of claim 1 in which said means connected to said lever assembly and to said control device includes means for adjusting the length of said means for changing the relation between said cam follower element and said control device.

References Cited

UNITED STATES PATENTS

| | | | |
|---|---|---|---|
| 1,190,684 | 7/1916 | Struble | 74—514 X |
| 2,223,649 | 12/1940 | Wagner | 74—475 |
| 2,575,081 | 11/1951 | Watkins. | |
| 2,770,980 | 11/1956 | Millward | 74—489 |
| 2,846,896 | 8/1958 | Allen | 74—527 X |
| 2,983,160 | 5/1961 | Hause | 74—533 X |
| 3,334,521 | 8/1967 | Kast | 74—527 X |

FRED C. MATTERN, JR., *Primary Examiner.*

C. F. GREEN, *Assistant Examiner.*